March 8, 1966  S. ENGELSTEIN  3,238,655
MICROFICHE MASTER
Filed April 3, 1964  2 Sheets-Sheet 1
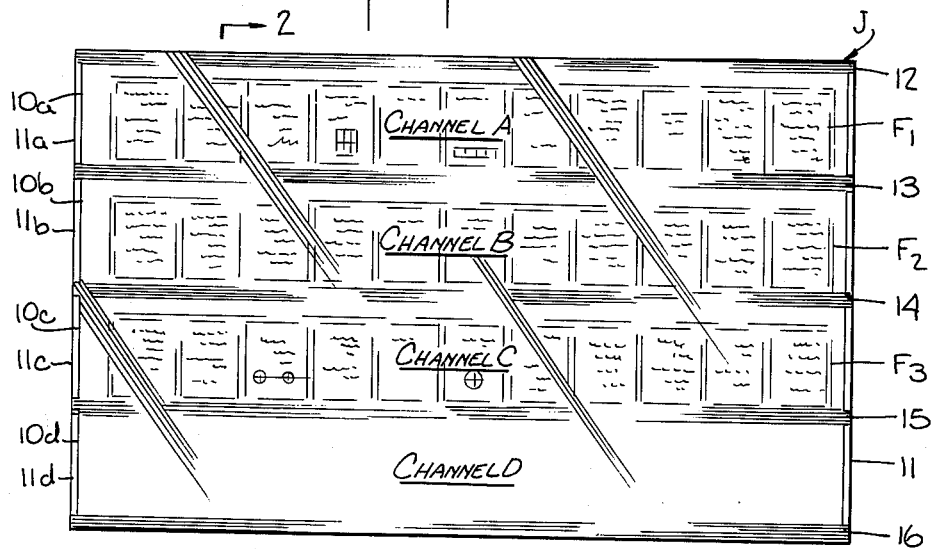
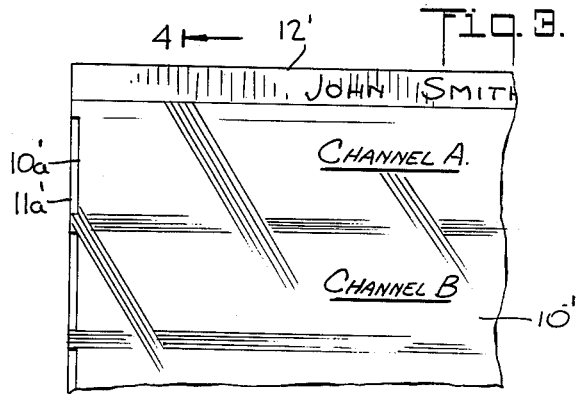
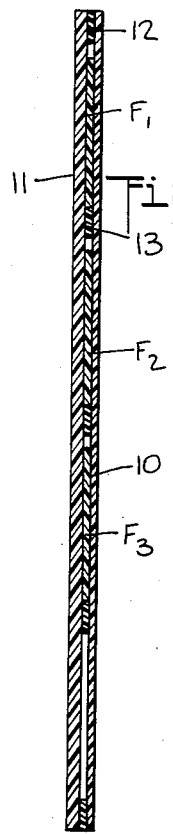
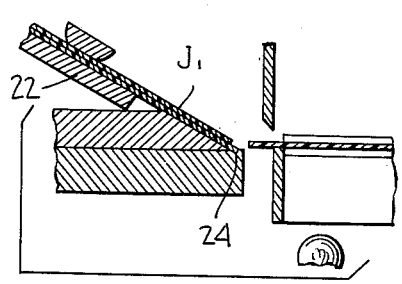
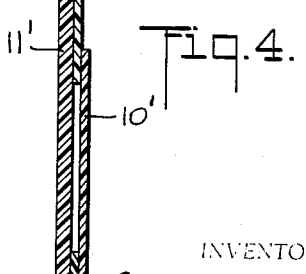
INVENTOR.
STANLEY ENGELSTEIN
BY
ATTORNEY March 8, 1966     S. ENGELSTEIN     3,238,655
MICROFICHE MASTER Filed April 3, 1964     2 Sheets-Sheet 2

REFERENCE COPY

FILM INSERTION MACHINE

INVENTOR.
STANLEY ENGELSTEIN
BY
ATTORNEY

United States Patent Office 3,238,655
Patented Mar. 8, 1966

3,238,655
MICROFICHE MASTER
Stanley Engelstein, New York, N.Y., assignor to NB Jackets Corporation, Long Island City, N.Y., a corporation of New York
Filed Apr. 3, 1964, Ser. No. 357,181
3 Claims. (Cl. 40—159)

This invention relates generally to transparent multiple-channel plastic jackets for protectively storing and displaying microfilm images, and more particularly to a reproducible microfiche master wherein microfilm strips are contained within the several channels of the jacket to provide a microform which may be stored or projected, and which lends itself effectively to contact printing to produce microfiche reference copies. This application is a continuation-in-part of my copending application Serial No. 150,244, filed November 6, 1961, now abandoned.

In order to conserve storage space and afford a ready means for retrieving information, it is now common practice to photograph documents, records, books and various forms of technical data in a sharply reduced scale on microfilm. Conventionally, a micro image of each book page or document is recorded on a separate frame on a microfilm roll. To view the recorded data, the roll is inserted in a reader or optical projector, the film being advanced to place a selected frame into the projection window whereby an enlarged and readable image is cast on a screen.

In recent years, a new technique has been developed to place a group of microfilm images on a single sheet rather than along a film roll. In such sheets, which are known commercially as "microfiches," the micro images are generally arranged serially along parallel rows, the sheet also bearing an identifying title which can be read by the unaided eye. The micro images are therefore arrayed in a grid formation on the sheet. A microfiche is useful where one wishes to incorporate on a single reproducible sheet, interrelated documents or other information pertaining to a particular subject matter or individual.

An original microfiche is known as a master, and the principal advantage of a microfiche master, apart from the fact that it provides a consolidated file record, is that it is readily reproducible to form additional or reference copies. The most effective way of deriving transparent reference copies from a microfiche master is by the contact-printing process, the microfiche master serving as the negative. In contact printing, a sensitive film is exposed in contact with the microfiche master. During exposure, the exposing light passes through the master to the emulsion side of the film. Ordinarily, close contact at all points between the master and the sensitive film is necessary if a sharp print is to be obtained. Printing is controlled either by varying the length of time of exposure with a constant light intensity, or varying the intensity of illumination with a constant time of exposure. By the use of particular photosensitive films, one may obtain a direct positive or negative copy of the microfiche master.

For example, in a hospital, records play a vital role, and for any one patient these records may entail X-rays, medical history, bed charts and other relevant documents. Rather than maintain these documents in separate files which make future retrieval difficult, to say nothing of the cost of storing and preserving such records, it is far more efficient to combine the various records on a single microfiche master. Then when there is a call for the case history of a patient, and this need may arise many years after the patient has left the hospital, one has merely to take out the microfiche master bearing the name of the patient and insert it in a contact printer to make a transparent reference copy which may be forwarded to the doctor or agency making the request. The recipient of the reference copy may view the case history by inserting the copy in a standard reader adapted to scan the row of microfiche images to select a particular frame for projection. Other copies may be made in a contact printer from the reference copy.

At present, there are two known ways of making original microfiches serving as masters from which microfiche reference copies can be run off by contact printing or other reproduction techniques. In one known method, the microfilm images are recorded in the usual way on a film roll, which roll is sectioned into strips, each containing several frames. These strips are then bonded in parallel rows on a transparent sheet made, for example, of acetate, to form a collage.

In another method, a special step-and-repeat camera is used to directly record the images on a transparent plastic sheet having a photographic emulsion thereon. The camera is adapted to project micro images successively along a top row on the sheet and then to shift to a row below, where images are again recorded in a stepwise manner. This step-by-step scanning process is repeated until the sheet contains all of the desired images relevant to the subject-matter or title thereon.

The advantages inherent in microfiches have been outlined in the October 1963 issue (Number 66) of The National Micronews, the official journal of the National Microfilm Association. Among these advatnages, are that the microfilm can provide rapid low-cost dissemination of information, while effecting savings in storage space and bulk. Also it can provide master negatives to produce printing plates for offset reproduction, whenever this might be required. Because of the unitary nature of microfiche, it is readily adaptable to virtually all indexing and coding systems.

I have found, however, that among the drawbacks characteristic of existing microfiches are the following:

(1) The original microfiches, whether produced by the collage or step-and-repeat technique, consist of micro images which are physically exposed and unprotected. Hence with repeated handling, the image surfaces are scratched and smudged, and tend to deteriorate. Sometimes the practice is to insert the original microfiche in a protective sleeve, which sleeve must be removed when contact printing.

(2) Once the microfiche is made, it is not possible as a practical matter, to add other images as may be necessary when a given file is to be supplemented. In the case of the step-and-repeat microfiche, if one desires to add another micro image to the sheet, this cannot be done, since the photosensitive sheet is already developed and printed. Therefore it is necessary to abandon the original microfiche and photograph a new step-and-repeat form containing the added micro image. In the case of the collage microfiche, while it is possible to paste on an additional image, this requires a fair amount of skill and care, and can only be accomplished with difficulty.

(3) Since the collage type of microfiche is made up of film strips pasted onto a sheet, the resultant discontinuous surfaces create problems in stacking, filing and handling such uneven sheets, and also problems resulting from delamination.

(4) Microfiches of the collage or single-sheet type have a tendency to curl and bow, hence steps have to be taken after a microfiche is processed to maintain the sheets flat.

Accordingly, it is the main object of the invention to provide a reproducible microfiche master wherein a plurality of microfilm strips are received within the parallel channels of a transparent jacket which acts to protect the strips and also to facilitate contact printing. Microfiche masters in accordance with the invention may be manufactured at low cost on a large scale using conventional microfilm cameras to produce the images in roll form, the roll being sectioned into strips which are then loaded into the channels of the jacket.

Still another object of the invention is to provide a microfiche master of the above-described type wherein the film strips may be sectioned from a roll and inserted into the channels of the jacket quickly and efficiently by available automatic machinery, thus avoiding the need for manual insertion.

A significant feature of the invention resides in the fact that the channels of the microfilm-loaded jacket have a thickness equal to that of the film inserted therein, with an extremely thin transparent ply introduced between the microfilm images and the photographic contact printing sheet, thereby avoiding spaces between the microfilm and the top ply and making possible sharp printing of high quality.

Also an object of the invention is to provide a microfiche master of the above type which may be readily titled on a typewriter.

Yet another object of the invention is to provide a microfiche master which includes ribbing to maintain the structure flat at all times.

Briefly stated, these objects are attained in a microfiche master constituted by a jacket having first and second panels of transparent material in superposed relation, a plurality of ribs in parallel relation being interposed between said panels and secured thereto to maintain said panels in spaced relation and to define open-ended channels for receiving microfilm strip inserts, the ribs having a thickness equal to that of said inserts whereby the channels in the jacket are of a thickness matching that of the film inserted therein.

The edges of one of said panels at the channel openings on at least one end of said jacket are cut back substantially the full width thereof to provide steps facilitating insertion of microfilm strips.

The invention is of particular value in connection with automatic film feeding mechanisms of the type disclosed in applicant's Patent No. 2,937,483, issued May 24, 1960. Preferably, the transparent top panel is relatively thin with respect to the bottom panel whereby the microfilm is effectively in direct contact with the sensitive film used in contact printing and sharp images are produced thereby in the reference copy.

For a better understanding of the invention as well as other objects and further features thereof, reference is had to the following detailed description to be read in conjunction with the accompanying drawings, wherein like components in the various views are identified by like reference numerals. In the drawings:

FIG. 1 is a plan view of a preferred embodiment of a microfiche master in accordance with the invention;

FIG. 2 is a section taken along lines 2—2 of FIG. 1;

FIG. 3 is a modified form of microfiche master which facilitates titling;

FIG. 4 is a section taken along lines 4—4 of FIG. 3;

FIG. 7 shows a detail of the machine.

Figure 5:
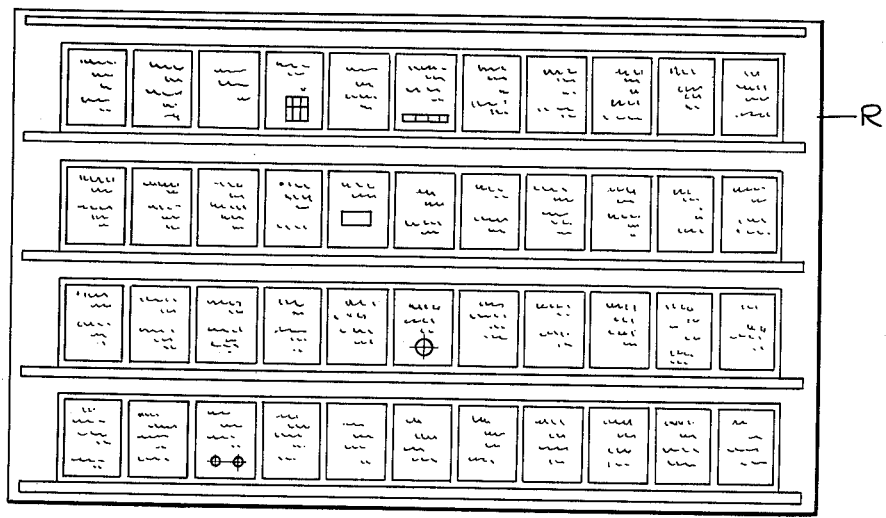
FIG. 5 is a plan view of a microfiche copy made from the master shown in FIG. 1.

Referring now to the drawings and more particularly to FIG. 1, a microfiche master in accordance with the invention is constituted by a transparent multiple-channel jacket J thereof, whose parallel channels A, B, C and D contain microfilm strips $F_1$, $F_2$ and $F_3$. Channel D is left vacant to permit the future insertion of a microfilm strip, should it be desired to add further data to the microfiche.

The multiple-channel jacket according to the invention comprises two transparent rectangular panels 10 and 11 in superposed relation, the panels being formed of clear, flexible plastic material, such as cellulose acetate, polyester film, Mylar, or any other suitable transparent sheeting having high tensile strength. Interposed between the top and bottom panels and adhesively secured thereto are plastic or paper ribs formed by longitudinally extending strips 12, 13, 14, 15 and 16 in parallel relation. Ribs 12 and 16 are aligned with the long sides of the panels, the remaining ribs being disposed at intermediate positions to define parallel channels A, B, C and D open at either end. The channels are of like width to accommodate microfilm strips of a given size, such as 16 mm. or 35 mm. film.

To facilitate the insertion of film strips into the channels, the extremities of top panel 10 in each channel are cut back or notched substantially the full width of the channel opening, such as at 10a and 10b, whereby the underlying edges of panel 11 are exposed to form steps, such as steps 11a and 11b. It will be noted that the ribs 12 to 16 extend the full length of panel 11 to provide guides at the channel entrances. The ribs may be of colored material to mark the channel boundaries. While the notches are shown as excluding the adjacent portions of the ribs, in practice the notches may cut into the ribs.

It is not essential that the channel be stepped or lapped at both ends, since in practice insertions are made in a given direction and it is sufficient that the channel entry only be lapped. This invention is, of course, not limited to the particular construction shown in FIGS. 1 and 2, and any number of channels may be made in any desired width. When using film-inserting machinery as disclosed in my prior Patent 2,937,483, film insertion is made at an angle to the plane of the jacket, the edge of the film striking the step and being flexed thereby to bend inwardly into the channel through the opening.

It is important to bear in mind that the cut-back in the channels makes possible the angular insertion of a flexible film and that the actual angle of insertion is not critical. Lacking this cut-back, with conventional jackets one must very carefully align the film so that it is exactly coplanar with the channel opening, in order to effect insertion thereof. With a flexible film having tendencies to curl and with a very constricted channel opening, this operation is difficult to carry out in practice. When insertions are made on a large scale, the absence of cut-backs in accordance with the invention restricts film insertion to slow-speed and costly manual operations.

Figure 6:
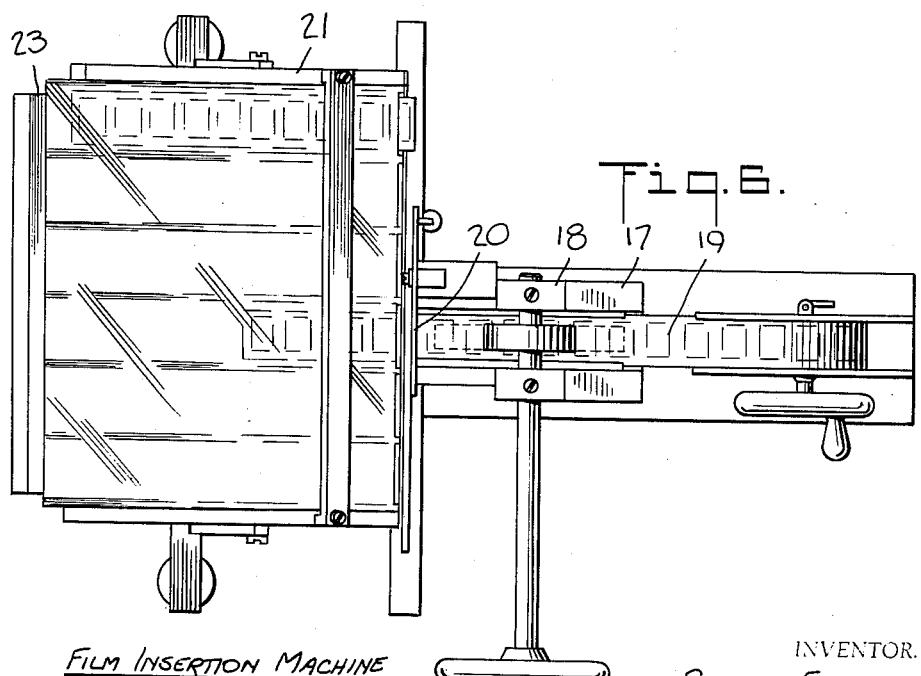
FIG. 6 is a plan view of an automatic machine for loading the microfiche.

As shown in FIGS. 6 and 7, the film-feeding machine as disclosed more fully in my prior patent above-identified, comprises a horizontal guide track 17 mounted on a standard 18, the microfilm web 19 unwound from a roll thereof passing along the track under a film slicer having a pivoted blade 20. The empty jacket of the type shown in FIG. 1, generally designated J', is supported on a loading platform 21 to which is attached at an inclined position a rectangular plate 22 dimensioned to accommodate the jacket.

A backstop 23 is affixed to the upper end of plate 22 to anchor the jacket firmly, the lower end of the jacket being received within a trench 24. Mounted transversely across the plate adjacent the lower end thereof is a bridge piece 25. The channel input end of the jacket J', as best seen in FIG. 7, lies flat against the inclined platform.

The loading platform is mounted on a slidable pedestal which is shiftable in the horizontal plane along rails to register any one of the jacket channels with the leading edge of incoming film. The platform is indexed to a new channel position after each insertion is made, and in practice, this indexing is carried out automatically by causing the platform to step sidewise to a new position in response to the cutting action of the film slicer, which occurs after the film has been inserted in a particular channel.

In operation, the film is transported by feed rollers toward the ledge or step of the selected jacket channel in registration therewith. The step is inclined relative to the leading edge of the film, and since the film is confined by the track, the continued forward motion thereof causes the film to strike the approximate center of the step. The film is deflected upwardly by the step into the channel. When the film is driven fully into the channel, the slicer 20 is activated to shear the film, the pedestal being then indexed to a new position for the next loading operation.

Thus the multiple-channel jacket J lends itself to automatic loading with microfilm strips, the loaded jacket constituting a microfiche. It is important for handling and contact printing purposes that the thickness of the channels be identical to that of the film to avoid any spaces between the film and the top ply of the jacket. To this end, the thickness of the ribs 12, 13, 14, 15 and 16 is made substantially equal to the thickness of standard microfilm, which is about 6 mils.

Also to facilitate contact printing, the top panel should be exteremely thin, for it is this panel which is interposed between the microfilm strips and the sensitive photographic film. In practice, it has been found that Mylar (ethyl glycol terephthalate) sheeting of about one-half mil thickness and of exceptional transparency, is effective for this purpose, for it makes it possible for the microfilm to be virtually in contact with the emulsion side of the sensitive film, and no perceptible loss in image sharpness is experienced in reproduction. On the other hand, the back panel is made of somewhat thicker Mylar, such as 3 mils, to give body and strength to the jacket. This thickness in no way interferes with contact printing.

An example of a reference copy made by contact printing is shown in FIG. 5. This reference microfiche R is formed of a transparent photographic film having printed thereon four rows of micro images between which are black bars which represent the reproduced ribs of the master microfiche.

In order to make it possible to title a microfilm on a typewriter in a manner whereby the title will reproduce in contact printing as well as the images, the modified jacket shown in FIGS. 3 and 4 makes use of a top rib 12' formed of translucent rather than opaque material and having a relatively broad width as compared to rib 12 in FIG. 1. The top panel 10' is made somewhat shorter than the bottom panel 11', so as to expose a longitudinal portion of the rib 12'.

The exposed portion may be used to receive typeprint for titling purposes, and since the rib is translucent, the title will reproduce in contact printing. Since the title is made in conventional size type, it may be directly read by the unaided eye. This is important when the microfiche masters are stored, for the enlarged rib provides an identifying index therefor.

Where the masters are contained in a random-access file or in any other mechanized type of filing system, where cards are selected by means of punch code or other forms of binary indications, the bottom rib may be extended in the manner disclosed above in connection with the top rib, the bottom rib providing a surface for edge punching. Thus the microfiche masters may be used in automated information retrieval systems.

It is also important to note that while the microfilm strips may have a tendency to curl, the ribbed jacket in which they are contained resists such curling or bowing, and the master microfiche is maintained flat to facilitate filing and other handling operations.

While there have been shown preferred embodiments of microfiche masters in accordance with the invention, it will be appreciated that many changes and modifications may be made therein without, however, departing from the essential spirit of the invention as defined in the annexed claims.

What is claimed is:
1. A microfiche master adapted to produce reference copies by contact printing with a sensitive film, said master comprising:
 (A) top and bottom rectangular panels formed of transparent, flexible synthetic plastic material in superposed relation,
 (B) spacing means disposed along parallel lines between said panels to maintain said panels in spaced relation and to define open-ended multiple channels, one of said panels having cut-outs therein to provide lateral openings for said channels to facilitate the end insertion of film strips therein, and
 (C) microfilm strips inserted in said channels,
 (D) said spacing means having a thickness no greater than that of said strips to avoid spaces between contiguous surfaces of said strips and said top panel,
 (E) said top panel having a thickness no greater than about one mil whereby in contact printing the surfaces of said strips are virtually in contact with said sensitive film to produce readable reference copies, said bottom panel having a greater thickness than said top panel to impart body to said microfiche master.

2. In a microfiche master adapted to accommodate microfilm strips and to produce reference copies by contact printing with a sensitive film, the combination comprising:
 (A) top and bottom rectangular panels formed of transparent, flexible synthetic plastic material in superposed relation, and
 (B) a plurality of spacing elements disposed along parallel lines between said panels to maintain said panels in spaced relation and to define open-ended multiple channels,
 (C) said elements having a thickness no greater than that of microfilm strips inserted in said channels to avoid spaces between contiguous surfaces of said strips and said top panel,
 (D) said top panel having a thickness no greater than about one mil, whereby in contact printing the surfaces of the strips inserted in said channels are virtually in contact with said sensitive film to produce readable reference copies, said bottom panel having a greater thickness than said top panel to impart body to said microfiche master.

3. In a microfiche master as set forth in claim 2, wherein the element adjacent the upper edge of the microfiche is of translucent material and said top panel is shorter than said bottom panel to expose a portion of said translucent element whereby it may have a title printed thereon which is reproducible when contact-printing.

References Cited by the Examiner
UNITED STATES PATENTS

| | | | |
|---|---|---|---|
| 1,756,547 | 4/1930 | Hansen | 40—10 |
| 1,785,780 | 12/1930 | Maish | 40—23 |
| 2,154,510 | 4/1939 | King et al. | 40—159 X |
| 2,589,680 | 3/1952 | Denny | 88—24 |
| 2,775,050 | 12/1956 | Ellsworth | 40—159 |
| 2,799,107 | 7/1957 | McArthur | 40—159 |

EUGENE R. CAPOZIO, *Primary Examiner.*

JEROME SCHNALL, *Examiner.*

WENCELSO J. CONTRERAS, *Assistant Examiner.*